(12) United States Patent
Schneider

(10) Patent No.: US 12,449,871 B2
(45) Date of Patent: *Oct. 21, 2025

(54) HARDWARE ARCHITECTURE FOR USB-C PORT POWER

(71) Applicant: Google LLC, Mountain View, CA (US)

(72) Inventor: David Schneider, Mountain View, CA (US)

(73) Assignee: Google LLC, Mountain View, CA (US)

( * ) Notice: Subject to any disclaimer, the term of this patent is extended or adjusted under 35 U.S.C. 154(b) by 568 days.

This patent is subject to a terminal disclaimer.

(21) Appl. No.: 17/960,914

(22) Filed: Oct. 6, 2022

(65) Prior Publication Data

US 2023/0027267 A1 Jan. 26, 2023

Related U.S. Application Data

(63) Continuation of application No. 16/909,471, filed on Jun. 23, 2020, now Pat. No. 11,493,972.

(51) Int. Cl.
| | |
|---|---|
| *H01M 10/44* | (2006.01) |
| *G06F 1/26* | (2006.01) |
| *G06F 13/40* | (2006.01) |
| *H01M 10/46* | (2006.01) |
| *H02J 7/00* | (2006.01) |

(52) U.S. Cl.
CPC .......... *G06F 1/266* (2013.01); *G06F 13/4068* (2013.01); *H02J 7/0044* (2013.01); *H02J 7/0047* (2013.01); *G06F 2213/0042* (2013.01)

(58) Field of Classification Search
CPC ...... H02J 7/0044; H02J 7/0047; H02J 7/0042; G06F 2213/0042; G06F 1/266; G06F 13/4068

USPC .......... 320/107, 132, 148, 150, 161
See application file for complete search history.

(56) References Cited

U.S. PATENT DOCUMENTS

| | | |
|---|---|---|
| 9,048,666 B2 | 6/2015 | Su |
| 9,960,617 B2 | 5/2018 | Zhao |
| 9,971,395 B2 | 5/2018 | Chenault et al. |
| 10,530,108 B2 | 1/2020 | Liu |
| 11,493,972 B2 * | 11/2022 | Schneider ............... G06F 1/266 |
| 2010/0203945 A1 | 8/2010 | Pitocchelli et al. |
| 2011/0320829 A1 | 12/2011 | Chan |

(Continued)

FOREIGN PATENT DOCUMENTS

| | | |
|---|---|---|
| JP | 2020058220 A | 4/2020 |
| WO | 2018217508 A1 | 11/2018 |

OTHER PUBLICATIONS

International Search Report and Written Opinion for Application No. PCT/US2021/035634 dated Aug. 20, 2021.

*Primary Examiner* — Edward Tso
(74) *Attorney, Agent, or Firm* — Botos Churchill IP Law

(57) ABSTRACT

A system including a first Type-C port and a second Type-C port includes a mainboard and a sub-board. The mainboard includes battery terminals for connection to a battery, the first Type-C port, a primary switch-mode charger connected to the battery terminals and connected to the Type-C port, and an embedded controller. The sub-board includes the second Type-C port, and a secondary charging component connected to the second Type-C port and connected to the mainboard via a flexible connector. The embedded controller is configured to control the primary switch-mode charger and the secondary charging component for charging the battery.

35 Claims, 5 Drawing Sheets

(56) References Cited

U.S. PATENT DOCUMENTS

| | | |
|---|---|---|
| 2016/0172984 A1 | 6/2016 | Takagi et al. |
| 2018/0109134 A1 | 4/2018 | Carpenter et al. |
| 2018/0205237 A1 | 7/2018 | Kuo et al. |
| 2018/0314309 A1 | 11/2018 | Lyu |
| 2018/0341310 A1 | 11/2018 | Lambert et al. |
| 2019/0065422 A1 | 2/2019 | Sporck et al. |
| 2019/0103748 A1 | 4/2019 | Wu |
| 2019/0171269 A1 | 6/2019 | G et al. |
| 2020/0358295 A1 | 11/2020 | Lim et al. |
| 2021/0083489 A1 | 3/2021 | Long et al. |

\* cited by examiner

500

400

HARDWARE ARCHITECTURE FOR USB-C PORT POWER

CROSS REFERENCE TO RELATED APPLICATIONS

The present application is a continuation of U.S. patent application Ser. No. 16/909,471, filed Jun. 23, 2020, the entire disclosure of which is incorporated herein by reference.

BACKGROUND

A USB Type-C port may be configured to both provide power and receive power for charging. Power may be provided at a constant state or dynamically if the system is otherwise loaded. Adding multiple Type-C ports to a single device may be somewhat expensive. In addition, when Type-C ports are positioned at opposite end of the device, power and data needs to be stretched across the full width of the device. This may increase the cost in commonly used power architectures, which use rather naïve implementations of assigning a charger to each port. Architecture for multiple Type-C ports may include a mainboard and one or more sub-boards.

BRIEF SUMMARY

A hardware architecture for a computing device that has one or more Type-C ports described herein may reduce the cost of the mainboard that includes one Type-C port and may be scalable using sub-boards including additional Type-C ports for many different designs.

Aspects of the disclosure provide for a system comprising a mainboard and a sub-board. The mainboard includes battery terminals 113 as illustrated in FIG. 2 for connection to a battery, a first Type-C port, a primary switch-mode charger connected to the battery terminals 113 and connected to the Type-C port, and an embedded controller. The sub-board includes a second Type-C port, and a secondary charging component connected to the second Type-C port and connected to the mainboard via a flexible connector. The embedded controller is configured to control the primary switch-mode charger and the secondary charging component for charging the battery.

In one example, the primary switch-mode charger is a buck-boost charger. In another example, the secondary charging component is a buck-boost. In another example, the first Type-C port and the second Type-C port are connected in parallel by a system rail. In a further example, the system also includes a computing device configured to be powered by the battery. In this example, the computing device is optionally a personal laptop computer.

In yet another example, the embedded controller is configured to set an output voltage or an output current for the primary switch-mode charger based on a constant voltage setting or a constant current setting for the battery, and the primary switch-mode charger is configured to adjust the output voltage or the output current using a fast battery control loop based on a detected battery voltage or a detected battery current. In this example, the system optionally includes a battery FET in communication with the primary switch-mode charger, and the primary switch-mode charger optionally is also configured to control the battery FET using the fast battery control loop based on the detected battery voltage or the detected battery current and a charging mode for the battery. Further in this example, the primary switch-mode charger is optionally configured to determine the charging mode according to the detected battery voltage or the detected battery current and send a signal to control a gate voltage of the battery FET according to the determined charging mode. Additionally in this example, the battery FET is optionally integrated into the primary switch-mode charger.

In a still further example, the embedded controller is configured to detect a battery voltage or a battery current and, when a source device is connected to the second Type-C port, set an output voltage for the secondary charging component based on the detected battery voltage or the detected battery current. In this example, the embedded controller optionally is also configured to estimate one or more resistances in the system based on the detected battery voltage or the detected battery current. Further in this example, the embedded controller optionally is also configured to adjust the output voltage using IR compensation when there is a system load.

In the still further example, the primary switch-mode charger is configured to determine that the detected battery voltage exceeds a maximum voltage or the detected battery current exceeds a maximum current and shut off a battery FET connected to the battery terminals 113 to induce a voltage drop across the battery FET. In this example, that the detected battery voltage exceeds the maximum voltage or the detected battery current exceeds the maximum current is optionally determined based on an amount of power burned at the battery FET. Also in this example, the primary switch-mode charger optionally is also configured to send a notification to the embedded controller regarding shutting off the battery FET.

In another example, the primary switch-mode charger is configured to supply power signals to components required for PROCHOT and PSYS monitoring programs. In this example, the secondary charging component is optionally configured to supplement the PROCHOT and PSYS monitoring programs by communicating with the embedded controller. In a further example, the primary switch-mode charger and the secondary charging component are both configured to perform fast role swap. In this example, the primary switch-mode charger and the secondary charging component each optionally have an integrated Type-C port controller.

DETAILED DESCRIPTION

Overview

The technology relates to a hardware architecture for a USB Type-C port (or "Type-C port") that can be utilized in single-port or multi-port designs. A Type-C port is a receptacle for a USB connector system that is defined by a specification published by the USB Implementers Forum or adopted by the International Electrotechnical Commission. The Type-C port may be defined by the latest version of the specification or by one that is back-compatible with the latest version. The hardware architecture includes a charger integrated circuit and associated circuitry dedicated to each port, rather than using one central charger IC and corresponding circuitry that is connected to each port. Using this architecture may reduce cost and area of a single Type-C port on a main board. In addition, this architecture may be scaled to two or more Type-C ports easily by adding sub-boards having architectures configured for the additional Type-C ports.

Example Systems

Figure 1:
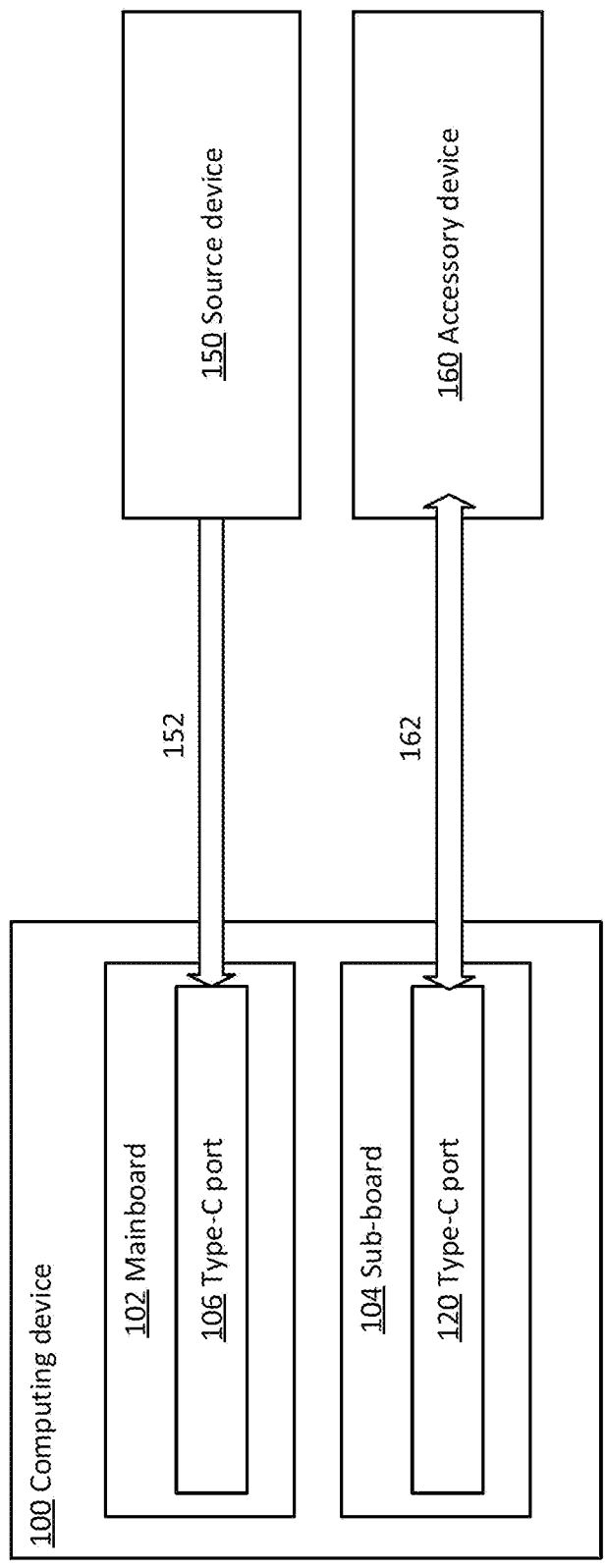
FIG. 1 is a functional diagram of a system in accordance with aspects of the technology.

A computing device, such as a personal laptop computer, mobile device, monitor, video game console, etc., may include one or more Type-C ports. The one or more Type-C ports may be configured to both receive input power from a source device to charge a battery of the computing device or output power to charge an accessory device. For example, as shown in FIG. 1, computing device 100 may have a first Type-C port 106 and a second Type-C port 120. As will discussed further below, the first Type-C port 106 may be on a mainboard 102 and the second Type-C port 120 may be on a sub-board 104. In the configuration shown in FIG. 1, a system 101 may include the computing device 100, a source device 150, and an accessory device 160. The first Type-C port 106 of the computing device 100 may be connected to a source device 150 via connection 152, and the second Type-C port 120 of the computing device 100 may be connected to an accessory device 160 via connection 162. A source device may be an AC/DC adapter, an external battery, or another computing device. An accessory device may be a keyboard, a mouse, a speaker, a monitor, or another computing device.

Figure 2:
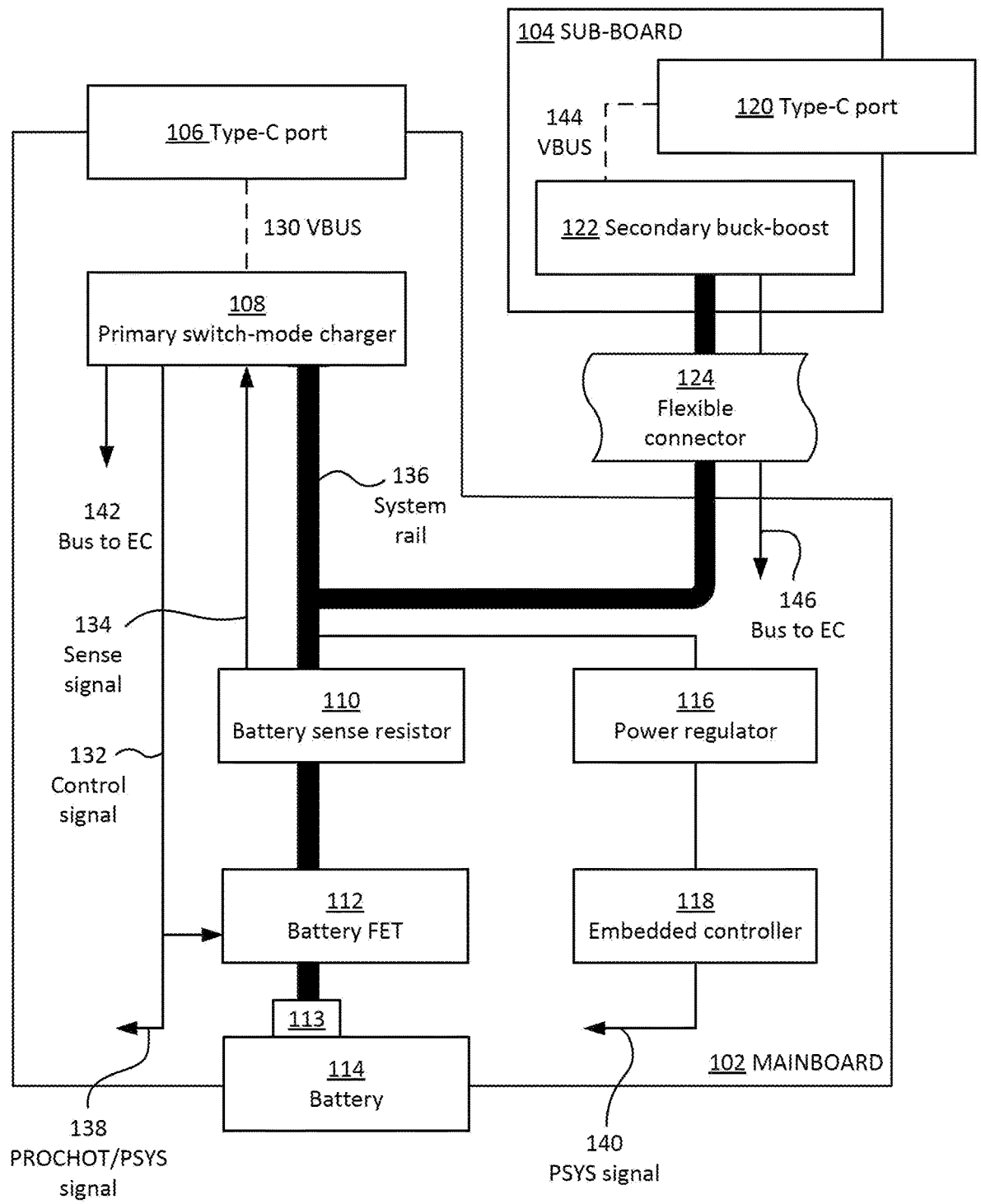
FIG. 2 is a pictorial diagram in accordance with aspects of the technology.

As shown in FIG. 2, the mainboard 102 of a computing device 100 may include a plurality of components that connect the first Type-C port 106 and a battery 114 of the computing device. The plurality of components may include a primary switch-mode battery charger 108, a battery sense resistor 110, a battery field-effect transistor (FET) 112, a power regulator 116, and an embedded controller 118. A Vbus wire 130 may connect the first Type-C port 106 with the primary switch-mode battery charger 108, and a system rail 136 may connect in series the primary switch-mode battery charger 108, the battery sense resistor 110, the battery FET 112, and the battery 114. A computer bus 142, such as an 12C bus, may connect the primary switch-mode battery charger 108 with the embedded controller 118.

When the primary switch-mode battery charger is connected to a source device, such as source device 150, the primary switch-mode battery charger 108 may be configured to convert input from the Vbus wire 130 to system power, and may further manage the battery 114 according to a charging mode. For example, the primary switch-mode battery charger 108 may convert alternating current (AC) or direct current (DC) to a specified DC output voltage suited for the computing device 100. In some implementations, the primary switch-mode battery charger 108 may be configured to perform a buck-boost voltage conversion process, which increases, decreases, or maintains a magnitude of the input DC voltage from the source device to a DC output voltage. In the buck-boost configuration, the primary switch-mode battery charger 108 may include an inverting topology, which switches between a buck converter and a boost converter using a switch. Alternatively, the configuration may include a 4-switch topology that combines a buck converter configuration and a boost converter configuration. Internal components of the primary switch-mode battery charger 108 may include a plurality of FETs and one or more inductors. According to what voltage is received at the primary switch-mode battery charger 108, a signal may be transmitted to the battery FET 112 to cause the battery FET to enable the battery 114 to be charged in a corresponding charging mode. The charging modes may include shut off mode, saturation mode, or linear mode. The signal may control a gate voltage, or threshold voltage, of the battery FET 112 to activate the corresponding charging mode. In some implementations, the battery FET 112 may be integrated into the primary switch-mode battery charger 108.

The primary switch-mode battery charger 108 may also be configured to supply signals, such as signal 138, to the components required for PROCHOT and PSYS monitoring programs without intervention from the embedded controller 118. The PROCHOT monitoring program includes a thermal control circuit that is activated when one or more processors in the computing device has reached a maximum safe operating temperature. The signal 138 may be an activating signal in this example. The PSYS monitoring program provides a signal that represents a total system power, or a total system load, at a current instant. The signal 138 may indicate the total system power in this example.

When the computing device or the source device that is connected to the first Type-C port 106 indicates that it may request a fast role swap, the primary switch-mode battery charger 108 may additionally be configured for a fast role swap corresponding to the respective device. The indication may be hardwired in the computing device or the source device as a setting for corresponding Type-C port or connector. If the primary switch-mode battery charger 108 has an integrated Type-C port controller (TCPC), receipt of the indication will activate the configuration channel Fast Role Swap (CC FRS) detector. When activated, the CC FRS detector may monitor a configuration channel pin voltage received from a connector. The CC pin voltage is generated from the source device or the computing device acting as a source to an accessory device. The CC FRS detector may run a FRS protocol that switches a device from being a source to a sink, and vice versa, when the CC pin voltage falls below a threshold. The FRS protocol may be defined in a specification published by the USB Implementers Forum or adopted by the International Electrotechnical Commission. If the primary switch-mode battery charger 108 has a separate TCPC rather than an integrated TCPC, the primary switch-mode battery charger may monitor a CC pin voltage, and the separate TCPC may be configured to output a FRS signal upon detection that the CC pin voltage falls below a threshold. The FRS signal may trigger the FRS protocol as described above.

The battery sense resistor 110 may be configured to sense current to and/or from the battery. At the same time, voltage may also be sensed at the battery sense resistor. A signal 134 carrying the sensed current or voltage may be sent to the primary switch-mode battery charger 108 to be read. In response, the primary switch-mode battery charger 108 may send another signal 132 to the battery FET 112 to enable a particular charging mode for the battery 114. In particular, the signal 132 may cause the battery FET 112 to compensate for an amount of current or voltage that is also charging or draining the battery, such as by setting the gate voltage for the battery FET 112 to implement a particular charging mode according to the load or lack thereof on the battery detected via the battery sense resistor 110. Further details are discussed below in the Example Methods.

The battery FET 112 may be configured to further isolate the battery 114. Having the battery FET 112 positioned between the battery 114 and the other components may allow for any fluctuations in the current or voltage caused by any of the other components to be compensated for at the battery FET 112.

The power regulator 116 may be configured to generate a number of volts needed for the embedded controller 118 from the battery 114 to the embedded controller 118. For example, the number of volts may be 3.3V or any other number of volts.

The embedded controller 118 is in communication with the primary switch-mode battery charger 108. Via the communication with the primary switch-mode battery charger 108, the embedded controller 118 may send control signals, such as signals 132 to the battery FET 112. For example, the embedded controller 118 may be configured to adjust the regulated voltages or currents in the primary switch-mode battery charger 108 or the battery FET 112. The embedded controller 118 may also be configured to track the current and/or voltage sensed by the battery sense resistor 110 via the primary switch-mode battery charger 108.

When an accessory device is connected to the first Type-C port, the embedded controller 118 may set the primary switch-mode battery charger into a source mode, such as OTG host mode, to generate a voltage for the Vbus to the accessory device. The voltage may be generated by pulling power from the system rail, which carries a system voltage (Vsys). In addition, the voltage may be generated based on any set current limit that is determined by the embedded controller. The set current limit may be determined by sensing an actual current draw via a built-in analog-to-digital convertor in the charger.

As further shown in FIGS. 1 and 2, a second Type-C port 120 may be a part of the computing device 100. In this implementation, the second Type-C port 120 may be on a sub-board 104. As shown in FIG. 2, secondary charging component may also be on the sub-board 104, connected to the second Type-C port 120 via a Vbus wire 144. For example, the secondary charging component may be a secondary switch-mode power supply 122, such as a buck-boost. In an alternative implementation, the secondary charging component may be a secondary charger.

The sub-board 104 may be connected to the mainboard 102 using a flexible connector 124, such as a flexible flat cable or a flexible printed circuit. The flexible connector 124 may connect the secondary switch-mode power supply 122 to the system rail 136 on the mainboard 102, resulting in the secondary switch-mode power supply 122 being in series with the battery sense resistor 110 and the battery FET 112 on the mainboard 102, and in parallel with the primary switch-mode battery charger 106. The flexible connector 124 may also connect the secondary switch-mode power supply 122 to the embedded controller 118 on the mainboard 102. The secondary switch-mode power supply 122 may be controlled by the embedded controller 118 in a same or similar manner as the primary switch-mode battery charger 108 as described above.

When nothing is connected to the second Type-C port 120, the secondary switch-mode power supply 122 may be in a lowest power mode.

Figure 3:
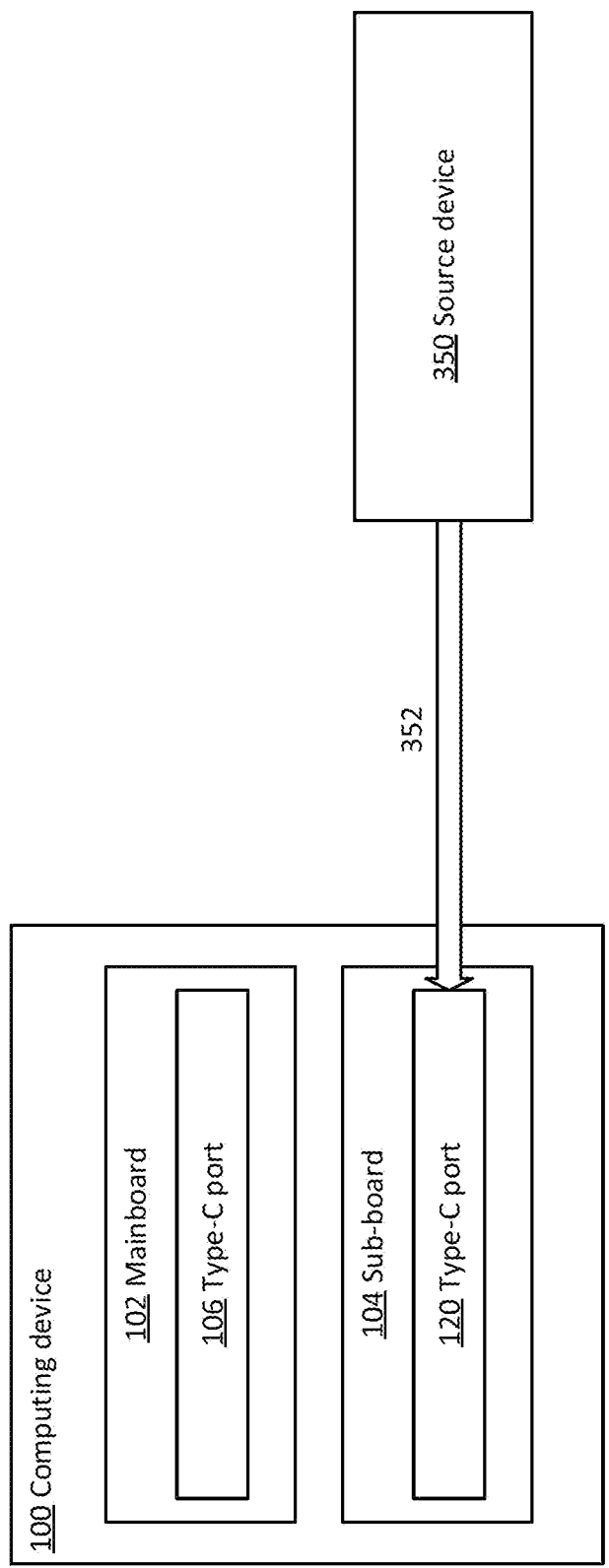
FIG. 3 is a functional diagram of a system in accordance with aspects of the technology.

When a source device is connected to the second Type-C port 120, such as in system 300 in FIG. 3 where source device 350 is connected to the second Type-C port 120 of the computing device 100 via connection 352, the secondary switch-mode power supply 122 may be configured to supplement the regular PROCHOT and PSYS monitoring programs. For example, as a supplement to PROCHOT run on the primary switch-mode battery charger 108, the secondary switch-mode power supply 122 may be configured to alert the embedded controller 118 when the secondary switch-mode power supply 122 overheats, at which point the embedded controller 118 may send a signal 140 to run a cooling program. As a supplement to PSYS run on the primary switch-mode battery charger 108, the secondary switch-mode power supply 122 may be polled regularly by the embedded controller 118 for an amount of power coming into the system from the source device and add it to the PSYS output in signal 140 so the monitoring program can accurately assess the amount of power being input to the system. Adding the amount of power to the PSYS output may be implemented using one or more methods whenever the system is operating to simplify the logic.

For example, the method implemented may depend on whether the primary switch-mode battery charger 108 has a Psys offset register, whether the primary switch-mode battery charger 108 can sink current on Psys, and/or whether the embedded controller has a current digital-to-analog converter (IDAC) or a voltage digital-to-analog converter (DAC). In a first method, if the primary switch-mode battery charger 108 has a Psys offset register, that register can be updated with the value retrieved from the secondary switch-mode power supply 122. The register should be cleared once the source device is disconnected. In a second method, if the primary switch-mode battery charger 108 does not have a Psys offset register but can sink current on Psys (in addition to sourcing), and the embedded controller 118 has an IDAC, the embedded controller 118 can supplement the primary switch-mode battery charger's output to Psys with the corresponding amount from the secondary charger, combining the currents.

In a third method, if the primary switch-mode battery charger 108 cannot sink current on Psys and the embedded controller 118 has an IDAC, the embedded controller 118 must disable the primary switch-mode battery charger's Psys output and instead also poll the primary switch-mode battery charger 108 for the battery power, summing the two, and outputting the resulting value scaled into current onto Psys. In a fourth method, if the embedded controller 118 has a DAC, not an IDAC, the embedded controller must perform the steps in the third method, and output the resulting value converted into voltage on Psys rather than outputting the current. In a fifth method, if the embedded controller 118 does not have an IDAC or DAC available, the embedded controller 118 must perform the steps in the third method, but output an RC-filtered pulse-width modulation signal with the duty cycle scaled based on the total power rather than outputting the current.

When the connected source device indicates that it may request a fast role swap, the secondary switch-mode power supply 122 may additionally be configured for a fast role swap in a same or similar way as the primary switch-mode battery charger 108 is configured for fast role swap described above.

When an accessory device is connected to the second Type-C port 120, such as in system 101 in FIG. 1, the embedded controller may set the secondary switch-mode power supply 122 into a source mode to generate a voltage for the Vbus to the accessory device in a same or similar way as the primary switch-mode battery charger 108 described above.

Figure 4:
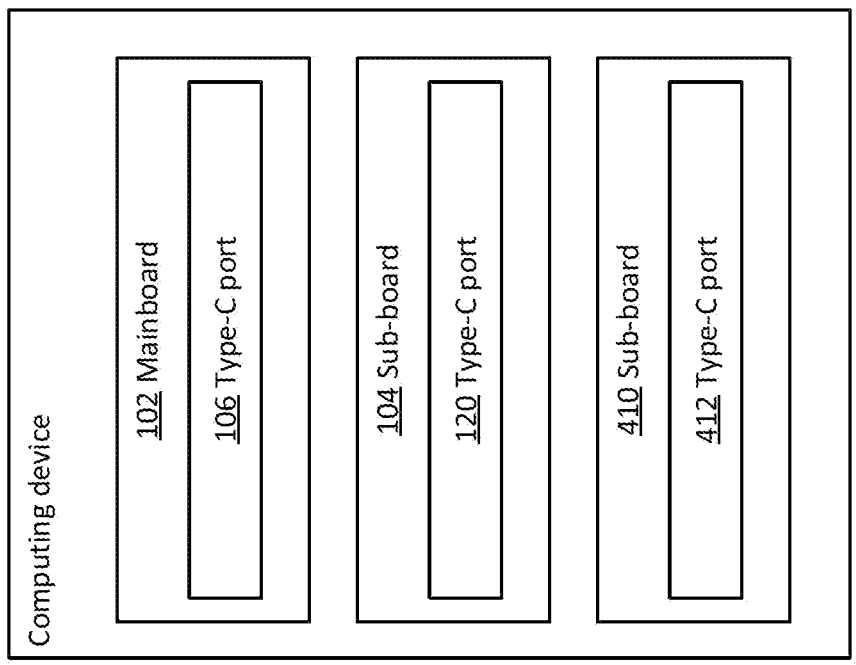
FIG. 4 is a pictorial diagram of a computing device in accordance with aspects of the technology.

Any additional Type-C ports may be configured using another sub-board, in a same or similar manner as the second Type-C port. The hardware architecture may therefore be scaled for more ports by adding more sub-boards attached to the mainboard. As shown in FIG. 4, computing device 400 includes the first Type-C port 106 on the mainboard 102, the second Type-C port 120 on the sub-board 104, and a third Type-C port 412 on another sub-board 410. In this assembly, the third Type-C port 412 may be in series with the battery sense resistor 110, the battery FET 112, and the battery 114 on the mainboard 102 and in parallel with the first Type-C port 106 and the second Type-C port 120.

Figure 5:
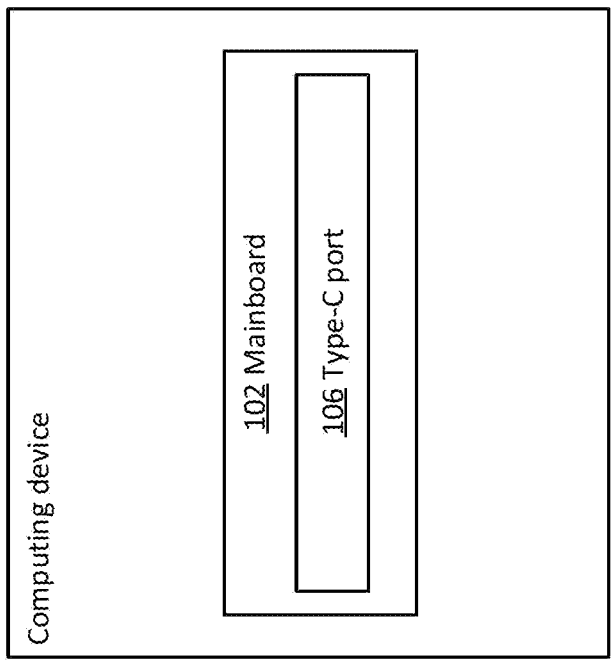
FIG. 5 is a pictorial diagram of a computing device in accordance with aspects of the technology.

When a computing device only has one Type-C port, such as computing device 500 shown in FIG. 5, the architecture of mainboard may be used without connecting any sub-boards. None of the components dedicated to other Type-C ports are on the mainboard, so the mainboard for the computing device 500 would be less expensive than other currently used architectures.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

The battery of the computing device may be charged in various modes using the embedded controller. When the battery is depleted, the embedded controller may query all Type-C ports to determine which ports have power applied on the Vbus wire by a connected source device. If more than one port has power applied on the Vbus wire, the embedded controller may determine and select which port has a highest amount of power applied on the Vbus wire. This determination may be made using one or more protocols available for the Type-C ports. The charging component on the ports other than the selected port may be shut off. The dead battery may then be charged using the selected Type-C port.

For system 101 in FIG. 1, the embedded controller 118 of computing device 100 may query the first Type-C port 106 and the second Type-C port 120 for an amount of power applied on Vbus wire 130 and Vbus wire 144, respectively. In the configuration in FIG. 1, the amount of power applied by the source device 150 on the first Type-C port 106 is greater than the amount of power applied by the accessory device 160 on the second Type-C port 120. Based on the query results, the embedded controller 118 may select the first Type-C port 106. The embedded controller 118 may also set the secondary buck boost 122 into an off mode or otherwise disable a charging capability of the secondary buck boost 122, associated with the second Type-C port 120.

For system 300 in FIG. 3, the embedded controller 118 of computing device 100 may query the first Type-C port 106 and the second Type-C port 120 for an amount of power applied on Vbus wire 130 and Vbus wire 144, respectively. In the configuration in FIG. 3, no power is applied on the first Type-C port 106, and the source device 350 applies power on the second Type-C port 120. Based on the query results, the embedded controller 118 may select the second Type-C port 120. The embedded controller 118 may also set the primary switch-mode battery charger 108 into an off mode or otherwise disable a charging capability of the primary switch-mode battery charger 108, associated with the first Type-C port 106.

When a source device is connected to a first Type-C port located on the mainboard and therefore charges via the primary switch-mode battery charger, the embedded controller may configure the primary switch-mode battery charger to output voltage and current based on a constant voltage (CV) and constant current (CC) setting. For example, the source device 150 may be connected to the first Type-C port 106 associated with the primary switch-mode battery charger 108, as shown in FIG. 1. For system 101, the embedded controller 118 may set the primary switch-mode battery charger 108 to output a voltage between 0 and a maximum voltage and a current between 0 and a maximum current, and the primary switch-mode battery charger 108 may adjust the output voltage and current based on a battery voltage and a battery current sensed by the primary switch-mode battery charger (fast battery control loop). The battery voltage and the battery current may be received via the signal 134 from the battery sense resistor 110.

The primary switch-mode battery charger may also control the battery FET based on the sensed battery voltage or battery current. In particular, the primary switch-mode battery charger 108 may send a signal 132 to control the gate voltage of the battery FET according to the corresponding charging mode.

The shut off mode may be activated when the sensed battery voltage or battery current indicates that the battery is disconnected (nothing to charge) or fully-charged (no additional charging needed), and the system is powered entirely by the input power from one of the Type-C ports (no load on the battery). Using this mode may protect the battery in the event that the slow regulation loop involving the embedded controller fails to reduce the system voltage to an acceptable level given the running conditions of the computing device. If the system needs more power than the Type-C port can provide, the primary switch-mode battery charger can switch the battery FET to the linear mode.

The linear mode may be activated when the sensed battery voltage or battery current indicates that the battery is being regularly charged, no adapter is plugged in, or the attached adapter is insufficient to power the system and power is being drawn from the battery to compensate for the insufficiency. Here, the primary switch-mode charger may set the gate voltage above a source voltage of the battery FET, while the battery FET is fully on. Voltage or current may be passed bidirectionally without burning much power in the battery FET. The primary switch-mode battery charger may activate this mode or remain in this mode as much as possible when a secondary switch-mode power supply is charging the battery.

The saturation mode may be activated when the sensed battery voltage or battery current indicates that the battery is depleted (or dead) and needs to be trickle-charged at a low voltage. Using this mode, the primary switch-mode battery charger may control the gate voltage to regulate either the battery voltage or current at a set level. For example, the gate voltage for this mode may enable the battery FET to operate as a low-dropout (LDO) to limit battery current while maintaining a reasonable voltage output from the primary switch-mode battery charger into the system. Excess voltage may be burned in the battery FET. While this is considered inefficient, it is effective for trickle-charging a depleted battery in this mode and also provides the benefit of protecting the battery against small spikes in the system voltage without interrupting charging. The saturation mode may safely operate for a set period of time, such as several minutes, after which the primary switch-mode battery charger can switch to another mode, such as the shut off mode.

When an environmental change occurs in the system, the embedded controller may adjust the output voltage and output current. The environmental change may be a change to a temperature of the system, system state (including battery FET shut off), or power delivery. The adjustments may be further based on the specifications of the battery and a target state of the system. For example, when the battery FET 112 has been shut off, the embedded controller 118 may lower the output voltage of the primary switch-mode charger 108 because additional voltage is no longer needed to charge the battery 114.

When a source device is connected to a second Type-C port on the sub-board and therefore charges via a secondary charging component, the embedded controller may configure the secondary charging component to output a set voltage into the system. For example, the source device 350 may be connected to the second Type-C port 120 associated with the secondary switch-mode power supply 122, which is the secondary charging component in the computing device 100. The secondary switch-mode power supply 122 may not directly sense the battery voltage and the battery current. Therefore, the embedded controller 118 may receive the sensed battery voltage and battery current from the primary switch-mode charger 108, such as via computer bus 142, then accordingly set and update the output voltage of the secondary switch-mode power supply 122 (slow battery control loop). In some implementations, the secondary switch-mode power supply 122 may further regulate the output voltage using IR compensation, so the output voltage may be increased proportional to any increase in current consumed by the system.

When there is no system load, the set voltage at the secondary charging component may be set by the embedded controller according to the system voltage. For example, the set voltage may be equal to the system voltage, where:

$$Vsys=\min(Vbat,Vcv)+\text{if}(Vbat<Vcv,Icc,Ibat)(Rsys+Rbat),\quad \text{[Equation 1]}$$

where Vcv is the specified CV charge voltage for the battery, Icc is the specified CC charge current for the battery, Vbat is the battery voltage as measured by the primary switch-mode battery charger or fuel gauge, Ibat is the battery current as measured by the primary switch-mode battery charger or fuel gauge, Rsys is the system resistance from the secondary switch-mode power supply's output to the branch point between the battery FET and the rest of the system rail, and Rbat is the system resistance from the end of Rsys to the voltage measurement point of Vbat. If Vbat is less than Vcv (and therefore in constant-current mode), Icc may be used in the formula. If Vbat is not less than Vcv (and therefore in constant voltage mode), Ibat may be used in the formula. Notably, Vbat will change as charge current is applied to the battery, so there may be several iterations of setting Vsys until a target voltage is reached for target system operations.

For implementing Equation 1, the embedded controller may estimate Rsys+Rbat together when the system is in shutdown or suspend as (Vsys−Vbat)/Icc when Vbat<Vcv or as (Vsys−Vcv)/Ibat when Vbat>=Vcv. The system may transition to shutdown or suspend upon receipt of user input or automatically when certain conditions are met (such as period of inactivity). When the system is in shutdown or suspend, system requirements may be so low that Vsys, Isys, and Rsys are negligible.

Alternatively, Rsys and Rbat may be determined separately after (Rsys+Rbat) is estimated as described above. The embedded controller may estimate Rsys while the system is running (not in suspend or shutdown) such that:

$$Rsys=[Vsys-(Rsys+Rbat)Ibat-Vbat]/[Isys-Ibat]=[Vsys-Rbat*Ibat-Vbat]/Isys\quad \text{[Equation 2]}.$$

Multiple calculations of Rsys using the formula may be averaged together to obtain a single estimated Rsys to account for fluctuations and errors. For example, at least 30 calculations may be estimated and averaged together. The estimated Rsys may be provided to the secondary switch-mode power supply and compensated for using IR compensation. Then, Vsys may be determined using the Equation 1 above with Rsys set to zero.

Over time, resistance values (Rsys, Rbat, and/or Rsys+Rbat) may be updated using sampling and/or calculations. The previously estimated values may be weighted more heavily than a newer samples or calculations so large fluctuations in the values do not occur. For example, a previously estimated value may be weighted 0.9 and a newer calculation may be weighted 0.1.

When there is a system load, the set voltage may be adjusted to compensate for a voltage drop due to an additional system resistance. In particular, when there is a system load, a greater voltage drop would occur across Rsys. To compensate for the voltage drop, the embedded controller may monitor the battery current and slowly adjust the set voltage until the battery current reaches the desired CC charge current for the battery. When the secondary switch-mode power supply becomes input-limited (i.e., when drawing a maximum power from the source device), the system voltage may naturally reduce as a result. In some cases, the embedded controller may detect that the secondary switch-mode power supply has become input-limited and stop increasing the set voltage.

When the source device is connected to the second Type-C port and therefore charges via the secondary charging component, the primary switch-mode charger still controls the battery FET as described above (fast battery control loop). The primary switch-mode charger may or may not be providing power out of the first Type-C port at the same time.

In addition, when the source device is connected to the second Type-C port and the sensed battery voltage or battery current exceeds a maximum voltage or current set in battery specifications, the primary switch-mode battery charger may at least partially shut off the battery FET to induce a voltage drop across the battery FET, thereby bringing the battery voltage and the battery current within specifications. When an amount of power burned at the battery FET exceeds specifications, the primary switch-mode charger may shut off the battery FET, ceasing battery charging, and notify the embedded controller of the change in system state. The amount of power burned at the battery FET may be calculated by the primary switch-mode battery charger based on the sensed battery current and a difference between Vsys and the sensed battery voltage, such as Ibat*(Vsys−Vbat). In some implementations, the notification may be sent prior to complete shut off of the battery FET so the embedded controller may make adjustment to the output voltage before the battery charging is ceased.

Figure 6:
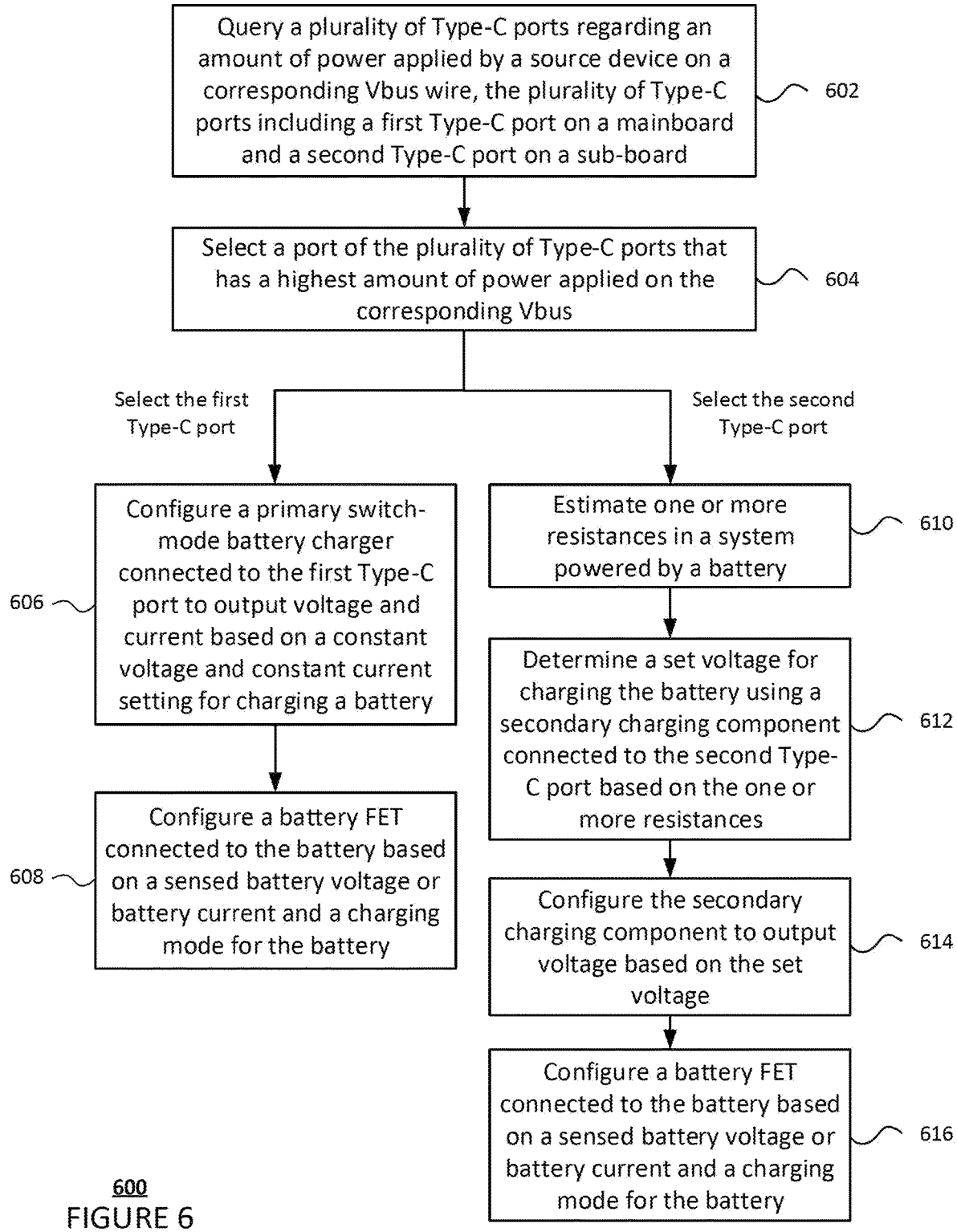
FIG. 6 is an example flow diagram in accordance with aspects of the technology.

In FIG. 6, flow diagram 600 depicts an example logic for charging a battery using a system architecture including a first Type-C port on a mainboard and a second Type-C port on a sub-board, such as the system architecture shown in FIG. 2. While FIG. 6 shows blocks in a particular order, the order may be varied and that multiple operations may be performed simultaneously. Also, operations may be added or omitted.

At block 602, a plurality of Type-C ports may be queried regarding an amount of power applied on by a source device a corresponding Vbus wire. The plurality of Type-C ports may include a first Type-C port on a mainboard and a second Type-C port on a sub-board. At block 604, one of the plurality of Type-C ports that has a highest amount of power applied on the corresponding Vbus may be selected. When the source device is connected to the first Type-C port, the first Type-C port may be selected, and the process may continue on to block 606. When the source device is connected to the second Type-C port, the second Type-C port may be selected, and the process may continue on to block 610.

At block 606, when the first Type-C port is selected, a primary switch-mode battery charger connected to the first Type-C port may be configured to output a voltage or a current based on a constant voltage setting or a constant current setting for charging a battery. At block 608, a battery FET connected to the battery may be configured based on a sensed battery voltage or a sensed battery current and a charging mode for the battery.

At block 610, when the second Type-C port is selected, one or more resistances in a system powered by a battery may be estimated. At block 612, a set voltage for charging the battery using a secondary charging component connected to the second Type-C port may be determined based on the one or more resistances. At block 614, the secondary charging component may be configured to output voltage based on the set voltage. At block 616, a battery FET connected to the battery may be configured based on a sensed battery voltage or a sensed battery current and a charging mode for the battery.

Implementing the hardware architecture as described herein may create a Type-C port having a lower cost and smaller area. For example, passing system voltage between the main board and the sub-board may require fewer wires and handles the parasitic resistance better than trying to pass separate 5V and input voltages. Devices having a single port or two ports may be significantly cheaper than existing designs. Devices having even more ports may be designed without needing to rearchitect the circuitry for the port. The resulting ports may be capable of outputting all required voltages and programmable power supply output and may also quickly swap to sourcing mode. In addition, having a number of components localized to each port may allow for different ports to be more easily located at different parts of a device and may allow for better heat dispersal during use. There may also be increased integration of components and therefore simpler sourcing and manufacture.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   a power and data port;
   a battery field-effect transistor (FET) coupled with battery terminals configured to electrically connect with a battery; and
   a charger connected to the battery FET and the power and data port,
   wherein the charger is configured to:
     select a charging mode from a plurality of charging modes based on a detected battery current or a detected battery voltage of the battery, and
     transmit a signal to the battery FET to charge the battery according to the selected charging mode.

2. The system of claim 1, wherein the charger is configured to perform a buck-boost voltage conversion process, which increases, decreases or maintains a magnitude of an input DC voltage from a source device to a DC output voltage.

3. The system of claim 1, wherein the charger is configured to switch between a buck converter configuration and a boost converter configuration via a switch.

4. The system of claim 1, wherein the transmitted signal is configured to control a gate voltage or a threshold voltage of the battery FET to activate the selected charging mode.

5. The system of claim 1, wherein when one or more processors associated with the system reach a maximum safe operating temperature, the charger is configured to send a thermal signal to a monitoring program to activate a thermal control circuit in the monitoring program.

6. The system of claim 1, wherein the charger is configured to include:
   a Type-C port controller configured to:
   monitor a configuration channel pin voltage received from the power and data port when coupled to a source device,
   generate a fast role swap signal when the configuration channel pin voltage falls below a threshold, and
   transmit the fast role swap signal to a configuration channel fast role swap detector to switch the source device from being a source to a sink.

7. The system of claim 1, wherein the charger is configured to calculate an amount of power consumed at the battery FET based on the detected battery current and a difference between a system voltage and the detected battery voltage.

8. The system of claim 1, wherein the charger is configured to:
   determine that the detected battery voltage exceeds a maximum voltage or that the detected battery current exceeds a maximum current; and
   shut off the battery FET to induce a voltage drop across the battery FET.

9. The system of claim 8, wherein the charger is configured to determine that the detected battery voltage exceeds the maximum voltage or the detected battery current exceeds the maximum current based on an amount of power consumed at the battery FET.

10. The system of claim 1, wherein the plurality of charging modes includes:
    a shut off mode in which the system is powered entirely by an input power from the power and data port,
    a saturation mode in which the charger is configured to control a gate voltage of the battery FET or regulate either a battery voltage or a battery current at a set level, and
    a linear mode in which the charger is configured to set the gate voltage above a source voltage of the battery FET, while the battery FET is on.

11. The system of claim 10, wherein the charger is configured to select the shut off mode when the detected battery current or the detected battery voltage indicates that the battery is disconnected or fully charged.

12. The system of claim 10, wherein the charger is configured to select the linear mode when any of the following occurs:
the detected battery current or the detected battery voltage indicates that the battery is charged;
no adapter is plugged in;
the adapter is insufficient to power the system and power is drawn from the battery to compensate; or
a secondary switch-mode power supply is charging the battery.

13. The system of claim 10, wherein the charger is configured to select the saturation mode when the detected battery current or the detected battery voltage indicates that the battery is depleted and needs to be trickle-charged at a low voltage.

14. The system of claim 1, further comprising an embedded controller, wherein the embedded controller is configured to adjust a voltage or current in either the charger or the battery FET.

15. The system of claim 14, wherein the embedded controller is configured to track the detected battery current or the detected battery voltage via the charger.

16. The system of claim 14, wherein when an accessory device is connected to the power and data port, the embedded controller is configured to set the charger to a source mode to provide a voltage to the accessory device.

17. The system of claim 14, wherein when the battery FET is shut off, the embedded controller is configured to lower an output voltage of the charger.

18. The system of claim 14, wherein:
the embedded controller is configured to set an output voltage or an output current for the charger based on a constant voltage setting or a constant current setting for the battery; and
the charger is configured to adjust the output voltage or the output current using a fast battery control loop based on the detected battery current or the detected battery voltage.

19. The system of claim 18, wherein the charger is configured to control the battery FET using the fast battery control loop based on the detected battery current or the detected battery voltage and the selected charging mode.

20. The system of claim 14, wherein when an amount of power consumed at the battery FET exceeds a predetermined specification, the charger is configured to shut off the battery FET, cease battery charging, and notify the embedded controller of a change in a system state.

21. A system comprising:
a power and data port;
a charging component connected to the power and data port; and
an embedded controller configured to:
estimate a resistance in the system based on a detected battery current or a detected battery voltage of a battery, and
determine a set voltage for charging the battery using the charging component based on the resistance in the system,
wherein the charging component is configured to output voltage based on the set voltage.

22. The system of claim 21, further comprising a battery field-effect transistor (FET) connected to the battery, wherein the battery FET is configured based on a charging mode of the battery and at least one of the detected battery current and the detected battery voltage.

23. The system of claim 21, wherein when the detected battery voltage is less than a predetermined charge voltage for the battery, the embedded controller is configured to determine the set voltage based on a predetermined charge current for the battery.

24. The system of claim 21, wherein when the detected battery voltage is not less than a predetermined charge voltage for the battery, the embedded controller is configured to determine the set voltage based on the detected battery current.

25. The system of claim 21, wherein the embedded controller is configured to continuously update the set voltage until a target voltage is reached for a target operation of the system.

26. The system of claim 21, wherein when in the presence of a system load, the embedded controller is configured to adjust the set voltage to compensate for a voltage drop due to an additional system resistance.

27. The system of claim 26, wherein to compensate for the voltage drop, the embedded controller is configured to adjust the set voltage until the detected battery current reaches a desired charge current for the battery.

28. The system of claim 21, wherein the embedded controller is configured to detect that the charging component draws a maximum power from a source device, and stop increasing the set voltage upon detection that the charging component draws the maximum power from the source device.

29. The system of claim 21, wherein the charging component is configured to alert the embedded controller when the charging component overheats, in order to trigger the embedded controller to run a cooling program.

30. The system of claim 21, wherein when an accessory device is connected to the power and data port, the embedded controller is configured to set the charging component to a source mode to output voltage to the accessory device.

31. The system of claim 21, wherein when a source device is connected to the power and data port, the embedded controller is configured to set the charging component to output voltage into the system.

32. The system of claim 21, wherein the charging component is a buck-boost device or a secondary charger.

33. The system of claim 21, further comprising a battery sense resistor configured to detect the battery current and/or the battery voltage.

34. A method for charging a battery, comprising:
detecting, by a battery sense resistor, a battery current or a battery voltage of the battery;
selecting, by a charger, a charging mode from a plurality of charging modes based on the detected battery current or the detected battery voltage, the charger being connected to a battery FET and a power and data port; and
transmitting, by the charger, a signal to the battery FET to charge the battery according to the selected charging mode.

35. A method for charging a battery, comprising:
detecting, by a battery sense resistor, a battery current or a battery voltage of the battery;
estimating, by an embedded controller, a resistance in a system based on the detected battery current or the detected battery voltage;
determine a set voltage for charging the battery using a charging component based on the resistance in the system, the charging component being connected to a power and data port; and
outputting voltage, by the charging component, based on the set voltage.

* * * * *